(12) United States Patent
Ren et al.

(10) Patent No.: US 11,724,393 B2
(45) Date of Patent: Aug. 15, 2023

(54) ROBOTIC ARM SPACE POSITION ADJUSTMENT METHOD, ROBOTIC ARM CONTROLLER AND COMPUTER READABLE STORAGE MEDIUM

(71) Applicant: UBTECH ROBOTICS CORP LTD, Shenzhen (CN)

(72) Inventors: Xiaoyu Ren, Shenzhen (CN); Liqun Huang, Shenzhen (CN); Yuesong Wang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 371 days.

(21) Appl. No.: 17/137,382

(22) Filed: Dec. 30, 2020

(65) Prior Publication Data

US 2021/0387340 A1    Dec. 16, 2021

(30) Foreign Application Priority Data

Dec. 30, 2019    (CN) .......................... 201911398775.8

(51) Int. Cl.
   *B25J 9/16*    (2006.01)
(52) U.S. Cl.
   CPC .......... *B25J 9/1664* (2013.01); *B25J 9/1633* (2013.01)

(58) Field of Classification Search
   CPC ........ B25J 9/1664; B25J 9/1633; B25J 9/161; B25J 9/1612; B25J 9/1651; G05B 2219/39415
   See application file for complete search history.

(56) References Cited

U.S. PATENT DOCUMENTS

| | | | |
|---|---|---|---|
| 2014/0081461 A1* | 3/2014 | Williamson | B25J 9/1643 700/261 |
| 2014/0276953 A1* | 9/2014 | Swarup | B25J 18/007 606/130 |

\* cited by examiner

*Primary Examiner* — Abby Y Lin
*Assistant Examiner* — Karston G. Evans

(57) ABSTRACT

The present disclosure provides a robotic arm space position adjustment method, a robotic arm controller, and a computer readable storage medium. The method includes: calculating a potential energy function of moving a feature point of the robotic arm to a reference point based on an obtained preset acceleration of an artificial gravitational field, first vector of the artificial gravitational field in a preset reference coordinate system, second vector of the feature point of the robotic arm in the preset reference coordinate system, and a third vector of the reference point in the preset reference coordinate system; and calculating a null space virtual moment of moving the feature point of the robotic arm to the reference point based on a preset null space operator and the potential energy function, so as to adjust each joint of the robotic arm.

18 Claims, 4 Drawing Sheets

ROBOTIC ARM SPACE POSITION ADJUSTMENT METHOD, ROBOTIC ARM CONTROLLER AND COMPUTER READABLE STORAGE MEDIUM

CROSS REFERENCE TO RELATED APPLICATIONS

The present disclosure claims priority to Chinese Patent Application No. 201911398775.8, filed Dec. 30, 2019, which is hereby incorporated by reference herein as if set forth in its entirety.

BACKGROUND

1. Technical Field

The present disclosure relates to automatic control technology, and particularly to a robotic arm space position adjustment method, a robotic arm controller, and a computer readable storage medium.

2. Description of Related Art

The existence of redundant degrees of freedom enables a robotic arm to realize the motion planning of the redundant degrees of freedom of the robotic arm while ensuring that the execution of the tasks of the end effector not being affected, so as to limit the position of the joint or prevent from collision. Therefore, the control of the redundant degree of freedom of the redundant robotic arm is the key issue for the control of the redundant robotic arm.

Generally, the damping least squares method is used to solve the problem of the control of the redundant degree of freedom. However, the result obtained by the method is generally the optimal solution with least squares norm, and is difficult to arbitrarily adjust the motion of the redundant degree of freedom of the robotic arm according to the requirement of the tasks.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

Figure 1:
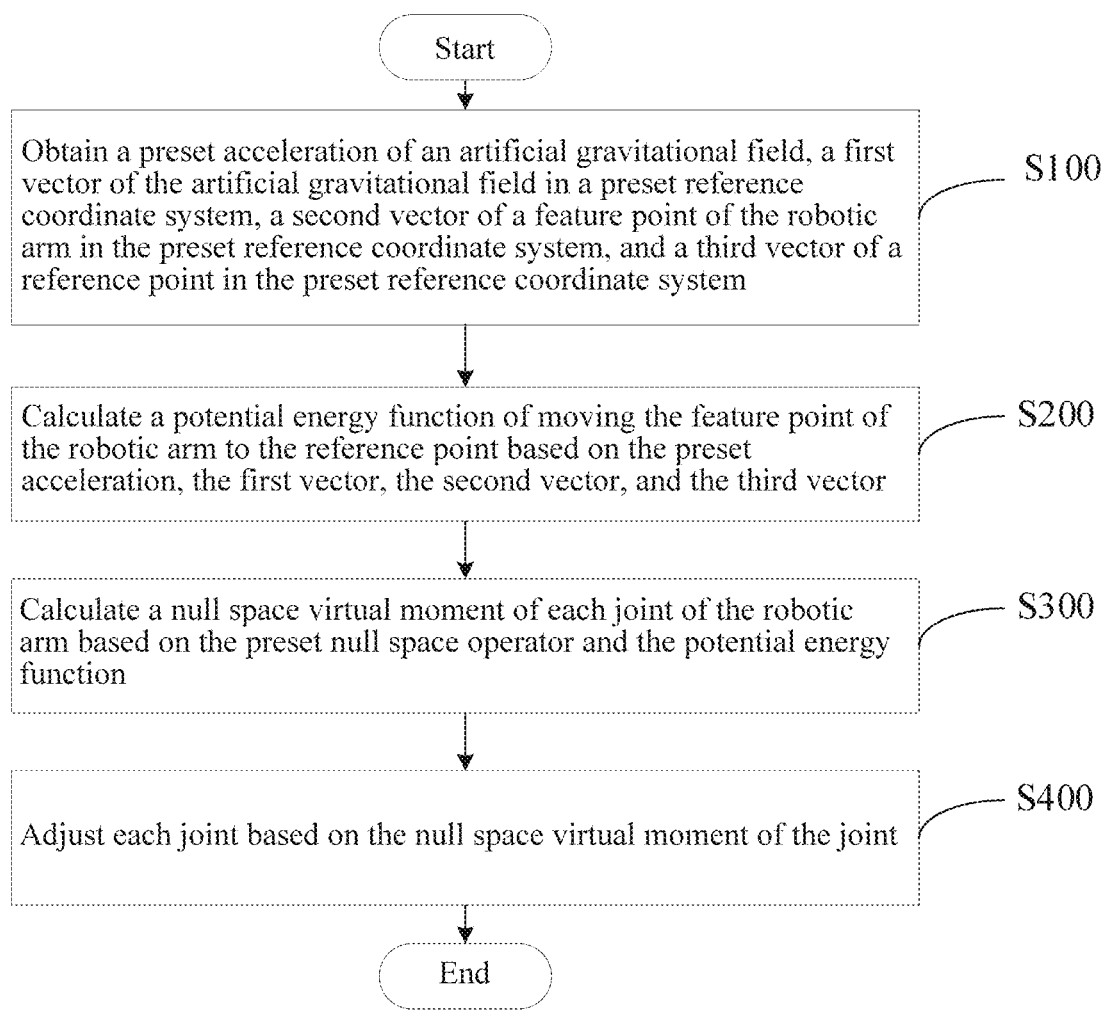
FIG. 1 is a flow chart of a robotic arm space position adjustment method according to an embodiment of the present disclosure.

In order to make the objects, technical schemes and advantages of the present disclosure more clear, the technical solutions in the embodiments of the present disclosure will be clearly and completely described below with reference to the drawings. Apparently, the described embodiments are part of the embodiments of the present disclosure, not all of the embodiments. The components in the embodiments that are described and shown in the drawings may generally be arranged and designed in various configurations.

Therefore, the following detailed description for the embodiments provided in the drawings is not intended to limit the scope of the present disclosure, but merely represents the embodiments of the present disclosure. All other embodiments obtained by those skilled in the art without creative efforts are within the scope of the present disclosure.

It should be noted that, similar reference numerals and letters indicate similar items in the following figures. Therefore, once an item is defined in one figure, it will not be further defined and explained in subsequent figures.

As described in the background art, it generally uses the damping least squares method to solve the problem of the control of the redundant degree of freedom. However, the result obtained by the method is generally the optimal solution with least squares norm, and is difficult to arbitrarily adjust the motion of the redundant degree of freedom of the robotic arm according to the requirement of the tasks.

In view of this, in this embodiment, a robotic arm space position adjustment method is provided, which is for a controller electrically connected to a robotic arm with redundant degrees of freedom or for the robotic arm itself. In the robotic arm, there is a joint connected between every two links. The end of the robotic arm located at an end of the robotic arm that is not connected to a link of other structures is called an "end". FIG. 1 is a flow chart of a robotic arm space position adjustment method according to an embodiment of the present disclosure. The method is a computer-implemented method executable for a processor. In one embodiment, the method may be implemented through a robotic arm space position adjustment apparatus shown in FIG. 3 or a robotic arm shown in FIG. 4. As shown in FIG. 1, the method includes the following steps.

S100: obtaining a preset acceleration of an artificial gravitational field, a first vector of the artificial gravitational field in a preset reference coordinate system, a second vector of a feature point of the robotic arm in the preset reference coordinate system, and a third vector of a reference point in the preset reference coordinate system.

Figure 2:
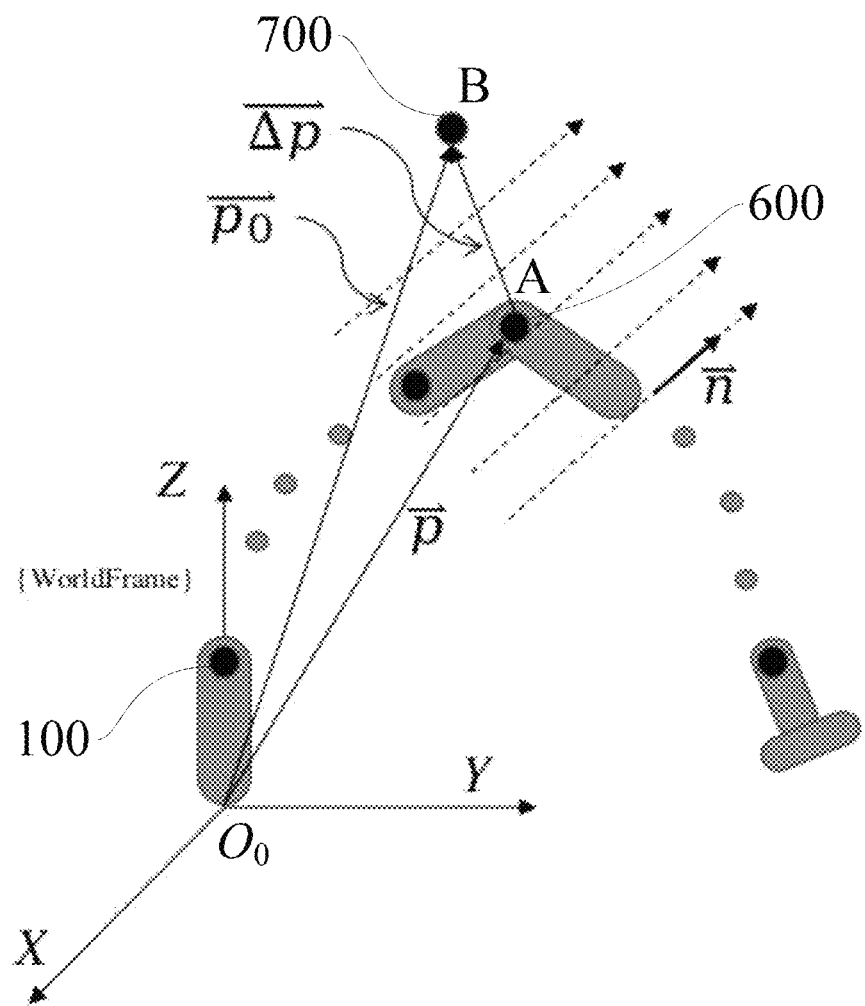
FIG. 2 is a schematic diagram of a scenario according to the embodiment of FIG. 1.

FIG. 2 is a schematic diagram of a scenario according to the embodiment of FIG. 1. As shown in FIG. 2, as an example, the preset reference coordinate system can be a world coordinate system. In the world coordinate system, there is an obstacle within the range of the motion of a robotic arm 100. Therefore, the position of the redundant joint of the robotic arm 100 in the space needs to be adjusted to avoid the obstacle. Based on this, a feature point A (shown as 600) is selected from a joint of the robotic arm 100, and the robotic arm 100 is controlled to move the feature point A (600) to a reference point B (shown as 700) to avoid the obstacle. It needs to be noted that, because each joint of the robotic arm 100 does not exist in isolation, during controlling the robotic arm 100 to move the feature point A (600) to the reference point B (700) to avoid the obstacle, the other joints need to be adjusted adaptively.

It should be noted that, since the robotic arm 100 has redundant degrees of freedom, each joint of the robotic arm 100 can avoid the obstacle from multiple directions. The artificial gravitational field is for indicating the overall motion trend of the robotic arm 100 during avoiding the obstacle. Based on this, the direction of the first vector corresponds to the motion trend of the robotic arm 100.

At the same time, during controlling the robotic arm 100 to move the feature point A (600) to the reference point B (700) to avoid the obstacle, the movement speed of the robotic arm 100 is positively related to the magnitude of the preset acceleration. In which, the preset acceleration can be adjusted according to the type of the robotic arm 100 in the actual usage scenario and the required movement speed of the robotic arm 100 in the actual usage scenario.

S200: calculating a potential energy function of moving the feature point of the robotic arm 100 to the reference point based on the preset acceleration, the first vector, the second vector, and the third vector.

S300: calculating a null space virtual moment of each joint of the robotic arm 100 based on the preset null space operator and the potential energy function.

In which, the preset null space operator is for keeping a pose (i.e., position and posture) of an end of the robotic arm 100 unchanged during motion.

S400: adjusting each joint based on the null space virtual moment of the joint.

In the above-mentioned method, by calculating a potential energy function of moving a feature point of the robotic arm 100 to a reference point based on an obtained preset acceleration of an artificial gravitational field, first vector of the artificial gravitational field in a preset reference coordinate system, second vector of the feature point of the robotic arm 100 in the preset reference coordinate system, and a third vector of the reference point in the preset reference coordinate system, and calculating a null space virtual moment of moving the feature point of the robotic arm 100 to the reference point based on a preset null space operator and the potential energy function, so as to adjust each joint of the robotic arm 100, the position of the redundant joint of the robotic arm 100 can be adjusted arbitrarily according to the requirement of the tasks.

In which, the S200 of calculating the potential energy function of moving the feature point of the robotic arm 100 to the reference point based on the preset acceleration, the first vector, the second vector, and the third vector includes: calculating a fourth vector from the feature point to the reference point based on the second vector and the third vector; and calculating the potential energy function based on the first vector, the fourth vector, and the preset acceleration.

In one embodiment, the step of calculating the potential energy function based on the first vector, the fourth vector, and the preset acceleration includes calculating the potential energy function using an equation of:

$$\emptyset = k \langle \vec{\Delta p} \cdot \vec{n} \rangle;$$

where, $\emptyset$ is the potential energy function, k is the preset acceleration, $\vec{\Delta p}$ is the fourth vector, $\vec{n}$ is the first vector, and $\langle \vec{\Delta p} \cdot \vec{n} \rangle$ represents a dot product of the fourth vector and the first vector.

As an example, the first vector $\vec{n}$ can be a unit vector for indicating the direction of the artificial gravitational field.

For the fourth vector $\vec{\Delta p}$, suppose that the second vector is expressed as $\vec{p}$ in the reference coordinate system, and the third vector is expressed as $\vec{p_0}$ in the reference coordinate system, then the fourth vector can be expressed as:

$$\vec{\Delta p} = \vec{p_0} - \vec{p}.$$

As an example, the second vector $\vec{p}$ is described as follows.

Referring to FIG. 2, $O_0$ is taken as the origin to create a DH coordinate system. Suppose that the coordinates of the second vector $\vec{p}$ in the space are $[r_x, r_y, r_z]$, then the second vector $\vec{p}$ can be expressed as:

$$\vec{p} = T_0^A(1:3,4);$$

where, (1:3,4) represents 1-3 elements in the fourth column of the homogeneous matrix $T_0^A$. The matrix $T_0^A$ can be expressed as:

$$T_0^A = T_0^1 * [r_x, r_y, r_z, 1]^T.$$

In the equation above, the form of $T_0^i$ is as follows:

$$T_0^i = T_0^1 T_0^2 \ldots T_{i-1}^i.$$

In the equation above, the form of $T_{i-1}^i$ is as follows:

$$T_{i-1}^i = \begin{bmatrix} R_{3\times3}(\theta_i) & O_{i-1}O_i \\ 0_{3\times3} & 1 \end{bmatrix}.$$

In the equation above, $R_{3\times3}(\theta_i)$ is a rotation matrix in the DH coordinate system that is the coordinate system for representing the pose of the i-th joint with respect to the coordinate system for representing the pose of the i−1-th joint, and $O_{i-1}O_i$ is the value of the coordinate in the DH coordinate system that is for representing the origin of the coordinate system for representing the pose of the i-th joint in the coordinate system for representing the pose of the i−1-th joint.

In one embodiment, after obtaining the potential energy function, the robotic arm 100 calculates the virtual moment of each joint in the robotic arm 100 using an equation of:

$$\tau_{\emptyset i} = -\frac{\partial \emptyset}{\partial \theta_i} - D\dot{\theta}_i i = 0, \ldots, n;$$

where, $\tau_{\emptyset i}$ is the virtual torque of the i-th joint of the robotic arm 100, $\emptyset$ is the potential energy function, $\dot{\theta}_i$ is the speed of the i-th joint, and D is the preset damping parameter. In which, the preset damping parameter D is introduced to suppress the vibration generated during the motion of the robotic arm 100. The larger the preset damping parameter D, the more difficult it is for the joints of the robotic arm 100 to rotate.

In one embodiment, the step of calculating the null space virtual torque of each joint of the robotic arm 100 based on the preset null space operator and the virtual torque of the joint includes: calculating the null space virtual torque of each joint of the robotic arm 100 using an equation of:

$$\tau_{\emptyset n} = N\tau_\emptyset;$$

$$N = I - J^T(J^{M+})^T; \text{ and}$$

$$J^{M+} = M^{-1}J^T(JM^{-1}J^T)^{-1};$$

where, $\tau_{\emptyset n}$ is the null space virtual moment of each joint of the robotic arm, N is the preset null space operator, I is an identity matrix, T is the transpose, $J^{M+}$ is a Jacobian inverse matrix obtained by performing weighted calculation on a inertia matrix of the robotic arm 100, and $M^{-1}$ is the inertia matrix of the robotic arm 100.

It should be noted that, in this embodiment, the robotic arm 100 can determine the first vector direction of the artificial gravitational field in the preset reference coordinate system, the position of the feature point of the robotic arm 100 in the preset reference coordinate system, and the position of the reference point in the preset reference coordinate system according to the relative position of the obstacle and the robotic arm 100 based on a preset rule. Alternatively, it can also provide a corresponding interactive interface for inputting the above-mentioned first vector direction, position of the feature point, and position of the reference point by the user.

Figure 3:
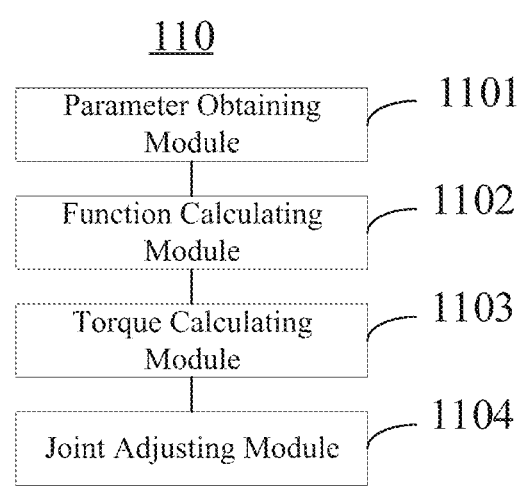
FIG. 3 is a schematic block diagram of a robotic arm space position adjustment apparatus according to an embodiment of the present disclosure.

FIG. 3 is a schematic block diagram of a robotic arm space position adjustment apparatus according to an embodiment of the present disclosure. Based on the same inventive concept, a robotic arm controller is further provided, which can be, for example, a controller for the robotic arm 100 with redundant degrees of freedom. As shown in FIG. 3, by functional division, a robotic arm space position adjustment apparatus 110 includes a parameter obtaining module 1101, a function calculating module 1102, a torque calculating module 1103, and a joint adjusting module 1104.

The parameter obtaining module 1101 is configured to obtain a preset acceleration of an artificial gravitational field, a first vector of the artificial gravitational field in a preset reference coordinate system, a second vector of a feature point of the robotic arm 100 in the preset reference coordinate system, and a third vector of a reference point in the preset reference coordinate system, where the direction of the first vector corresponds to a motion trend of the robotic arm 100, and a movement speed of the robotic arm 100 is positively related to the magnitude of the preset acceleration.

In this embodiment, the parameter obtaining module 1101 is configured to execute step S100 of FIG. 1. For a specific description of the parameter obtaining module 1101, refer to the description of step S100.

The function calculating module 1102 is configured to calculate a potential energy function of moving the feature point of the robotic arm 100 to the reference point based on the preset acceleration, the first vector, the second vector, and the third vector.

In this embodiment, the function calculating module 1102 is configured to execute step S200 of FIG. 1. For a specific description of the function calculating module 1102, refer to the description of step S200.

The torque calculating module 1103 is configured to calculate a null space virtual moment of each joint of the robotic arm 100 based on the preset null space operator and the potential energy function, where the preset null space operator is for keeping a pose of an end of the robotic arm 100 unchanged during motion.

In this embodiment, the torque calculating module 1103 is configured to execute step S300 of FIG. 1. For a specific description of the torque calculating module 1103, refer to the description of step S300.

The joint adjusting module 1104 is configured to adjust each joint based on the null space virtual moment of the joint.

In this embodiment, the joint adjusting module 1104 is configured to execute step S400 of FIG. 1. For a specific description of the joint adjusting module 1104, refer to the description of step S400.

In one embodiment, the function calculating module 1102 calculates the potential energy function by:

calculating a fourth vector from the feature point to the reference point based on the second vector and the third vector; and calculating the potential energy function based on the first vector, the fourth vector, and the preset acceleration.

Figure 4:
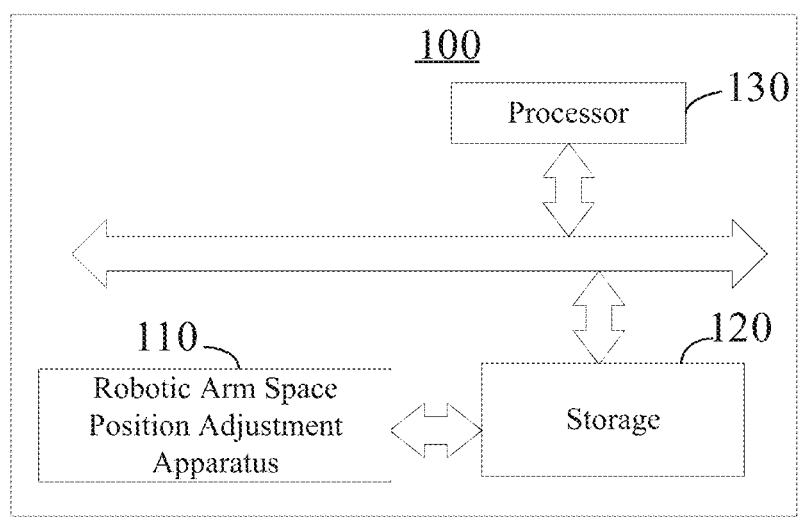
FIG. 4 is a schematic block diagram of a robotic arm according to an embodiment of the present disclosure.

FIG. 4 is a schematic block diagram of a robotic arm according to an embodiment of the present disclosure. The robotic arm 100 is further provided. As shown in FIG. 4, the robotic arm 100 includes a storage 120, a robotic arm space position adjustment apparatus 110, and a processor 130. The robotic arm space position adjustment apparatus 110 may store instructions (corresponding to the above-mentioned modules of the robotic arm space position adjustment apparatus 110) corresponding to the above-mentioned robotic arm space position adjustment method which can be executed by a processor to realize the above-mentioned robotic arm space position adjustment method. Alternatively, the storage 120 may store instructions corresponding to the above-mentioned robotic arm space position adjustment method that can be executed by the processor 130. When the instructions are executed by the processor 130, the above-mentioned robotic arm space position adjustment method is realized. In other embodiments, the storage 120 and the processor 130 can be included in the robotic arm space position adjustment apparatus 110.

The storage 120 and the processor 130 are directly or indirectly electrically connected to each other for data communication or interaction. For example, these components can be electrically connected to each other through one or more communication buses or signal lines. The robotic arm space position adjustment apparatus 110 is electrically connected includes at least one software functional module that can be stored in the storage 120 in the form of software or firmware or solidified in the operating system (OS) of the robotic arm 100. The processor 130 is for executing executable modules stored in the storage 120, for example, software functional modules included in the robotic arm space position adjustment apparatus 110, computer programs, and the like.

In which, the storage 120 may be, but is not limited to, a random access memory (RAM), a read only memory (ROM), and a programmable read-only memory (PROM), an erasable programmable read-Only memory (EPROM), electric erasable programmable read-only memory (EEPROM), and the like. The storage 120 is for storing a program, and the processor 130 executes the program after receiving an instruction of execution.

The processor 60 may be an integrated circuit chip with signal processing capability. The processor 60 may be a general-purpose processor, including a central processing unit (CPU), a network processor (Network Processor, NP), and the like, or a digital signal processor (DSP), an application specific integrated circuit (ASIC), a field-programmable gate array (FPGA), or be other programmable logic device, a discrete gate, a transistor logic device, and a discrete hardware component, which can implement or execute the methods, steps, and logical block diagrams in the embodiments. The general-purpose processor may be a microprocessor, a conventional processor, or the like.

A non-transitory computer readable storage medium storing a computer program is further provided. When the computer program is executed by the processor 130, the above-mentioned robotic arm space position adjustment method is implemented.

In summary, the present disclosure provides a robotic arm space position adjustment method, a robotic arm controller, and a computer readable storage medium. By calculating a potential energy function of moving a feature point of the robotic arm 100 to a reference point based on an obtained preset acceleration of an artificial gravitational field, first vector of the artificial gravitational field in a preset reference coordinate system, second vector of the feature point of the robotic arm 100 in the preset reference coordinate system, and a third vector of the reference point in the preset reference coordinate system, and calculating a null space virtual moment of moving the feature point of the robotic arm 100 to the reference point based on a preset null space operator and the potential energy function, so as to adjust each joint of the robotic arm 100, the position of the redundant joint of the robotic arm 100 can be adjusted arbitrarily according to the requirement of the tasks.

In the embodiments of the present disclosure, it should be noted that the disclosed apparatus (device) and method may also be implemented in other manners. The apparatus embodiment described above is merely illustrative. For example, the flowcharts and block diagrams in the drawings show the architectures, functions, and operations possible to implement on the apparatus, methods, and computer program products according to the embodiments of the present disclosure. In this regard, each block in the flowchart or block diagram may represent a part of a module, a program segment, or codes, where the part of the module, the program segment, or the codes contain one or more executable instructions for realizing the specified logic function. It should also be noted that, in some alternative implementations, the functions marked in the block may also occur in a different order from the order marked in the drawings. For example, two consecutive blocks can actually be executed in parallel, or they can sometimes be executed in the reverse order, which depends on the functions involved. It should also be noted that, each block in the block diagram and/or flowchart, and the combination of the blocks in the block diagram and/or flowchart, can be implemented by a dedicated hardware-based system that performs the specified functions or actions, or can be implemented through a combination of dedicated hardware and computer instructions.

In addition, the functional modules in the various embodiments of the present disclosure may be integrated together to form an independent part, or each module may exist alone, or two or more modules may be integrated to form an independent part.

The functions can be stored in a non-transitory computer readable storage medium if it is implemented in the form of a software functional module and sold or utilized as a separate product. Based on this understanding, the technical solution of the present disclosure, either essentially or in part, contributes to the prior art, or a part of the technical solution can be embodied in the form of a software product. The software product is stored in a storage medium, which includes a number of instructions for enabling a computer device (which can be a personal computer, a server, a network device, etc.) to execute all or a part of the steps of the methods described in each of the embodiments of the present disclosure. The above-mentioned storage medium includes a variety of media such as a USB disk, a mobile hard disk, a read-only memory (ROM), a random access memory (RAM), a magnetic disk, and an optical disk which is capable of storing program codes.

It should be noted that, in the present disclosure, relational terms such as first and second are only for distinguishing one entity/operation from another entity/operation, and do not necessarily require or imply any relationship or order between these entities/operations. Moreover, the terms "include", "comprise" or any other variants thereof are intended to cover non-exclusive inclusion, so that a process, method, object or apparatus including a series of elements not only includes the elements, but also includes other elements that are not explicitly listed or the elements inherent to the process, method, object or apparatus. The element defined by the sentence "including a . . . " does not exclude other same elements in the process, method, object or apparatus if there is no specific restriction thereto.

The forgoing is only the various embodiment of the present disclosure, while the scope of the present disclosure is not limited thereto. For those skilled in the art, various modifications or replacements that can be easily conceived within the technical scope of the present disclosure should be included within the scope of the present disclosure. Therefore, the scope of the present disclosure should be determined in accordance with the scope of the claims.

What is claimed is:

1. A computer-implemented space position adjustment method for a controller electrically connected to a robotic arm with redundant degrees of freedom, comprising steps of:

obtaining a preset acceleration of an artificial gravitational field, a first vector of the artificial gravitational field in a preset reference coordinate system, a second vector of a feature point of the robotic arm in the preset reference coordinate system, and a third vector of a reference point in the preset reference coordinate system, wherein the direction of the first vector corresponds to a motion trend of the robotic arm, and a movement speed of the robotic arm is positively related to the magnitude of the preset acceleration;

calculating a potential energy function of moving the feature point of the robotic arm to the reference point based on the preset acceleration, the first vector, the second vector, and the third vector;

calculating a null space virtual moment of each joint of the robotic arm based on the preset null space operator and the potential energy function, wherein the preset null space operator is for keeping a pose of an end of the robotic arm unchanged during motion; and adjusting each joint based on the null space virtual moment of the joint.

2. The method of claim 1, wherein the step of calculating the potential energy function of moving the feature point of the robotic arm to the reference point based on the preset acceleration, the first vector, the second vector, and the third vector comprises:

calculating a fourth vector from the feature point to the reference point based on the second vector and the third vector; and calculating the potential energy function based on the first vector, the fourth vector, and the preset acceleration.

3. The method of claim 2, wherein the step of calculating the potential energy function based on the first vector, the fourth vector, and the preset acceleration comprises:

calculating the potential energy function using an equation of:

$$\emptyset = k < \vec{\Delta p} \cdot \vec{n} >;$$

where, $\emptyset$ is the potential energy function, k is the preset acceleration, $\vec{\Delta p}$ is the fourth vector, $\vec{n}$ is the first vector, and $<\vec{\Delta p} \cdot \vec{n}>$ represents a dot product of the fourth vector and the first vector.

4. The method of claim 1, wherein the step of calculating the null space virtual moment of each joint of the robotic arm based on the preset null space operator and the potential energy function comprises:

calculating a virtual torque of each joint of the robotic arm based on a preset damping parameter and the potential energy function, wherein the preset damping parameter is for suppressing vibrations during the motion of the robotic arm;

calculating the null space virtual torque of each joint of the robotic arm based on the preset null space operator and the virtual torque of the joint.

5. The method of claim 4, wherein the step of calculating the virtual torque of each joint of the robotic arm based on the preset damping parameter and the potential energy function comprises:

calculating the virtual torque of each joint of the robotic arm using an equation of:

$$\tau_{\varnothing i} = -\frac{\partial \varnothing}{\partial \theta_i} - D\dot{\theta}_i i = 0, \ldots, n;$$

where, $\tau_{\varnothing i}$ is the virtual torque of the i-th joint of the robotic arm, $\varnothing$ is the potential energy function, $\dot{\theta}_i$ is the speed of the i-th joint, and D is the preset damping parameter.

6. The method of claim 4, wherein the step of calculating the null space virtual torque of each joint of the robotic arm based on the preset null space operator and the virtual torque of the joint comprises:

calculating the null space virtual torque of each joint of the robotic arm using an equation of:

$$\tau_{\varnothing n} = N\tau_\varnothing;$$

$$N = I - J^T(J^{M+})^T; \text{ and}$$

$$J^{M+} = M^{-1}J^T(M^{-1}J^T)^{-1};$$

where, $\tau_{\varnothing n}$ is the space virtual moment of each joint of the robotic arm, N is the preset space operator, I is an identity matrix, $J^{M+}$ is a Jacobian inverse matrix obtained by performing weighted calculation on a inertia matrix of the robotic arm, and $M^{-1}$ is the inertia matrix of the robotic arm.

7. A controller for a robotic arm, comprising:
a processor;
a memory coupled to the processor; and
one or more computer programs stored in the memory and executable on the processor;
wherein, the one or more computer programs comprise:
instructions for obtaining a preset acceleration of an artificial gravitational field, a first vector of the artificial gravitational field in a preset reference coordinate system, a second vector of a feature point of the robotic arm in the preset reference coordinate system, and a third vector of a reference point in the preset reference coordinate system, wherein the direction of the first vector corresponds to a motion trend of the robotic arm, and a movement speed of the robotic arm is positively related to the magnitude of the preset acceleration;
instructions for calculating a potential energy function of moving the feature point of the robotic arm to the reference point based on the preset acceleration, the first vector, the second vector, and the third vector;
instructions for calculating a null space virtual moment of each joint of the robotic arm based on the preset null space operator and the potential energy function, wherein the preset null space operator is for keeping a pose of an end of the robotic arm unchanged during motion; and
instructions for adjusting each joint based on the null space virtual moment of the joint.

8. The controller of claim 7, wherein the instructions for calculating the potential energy function of moving the feature point of the robotic arm to the reference point based on the preset acceleration, the first vector, the second vector, and the third vector comprise:

instructions for calculating a fourth vector from the feature point to the reference point based on the second vector and the third vector; and
instructions for calculating the potential energy function based on the first vector, the fourth vector, and the preset acceleration.

9. The controller of claim 8, wherein the instructions for calculating the potential energy function based on the first vector, the fourth vector, and the preset acceleration comprise:

instructions for calculating the potential energy function using an equation of:

$$\varnothing = k\langle \vec{\Delta p} \cdot \vec{n} \rangle;$$

where, $\varnothing$ is the potential energy function, k is the preset acceleration, $\vec{\Delta p}$ is the fourth vector, $\vec{n}$, is the first vector, and $\langle \vec{\Delta p} \cdot \vec{n} \rangle$ represents a dot product of the fourth vector and the first vector.

10. The controller of claim 7, wherein the instructions for calculating the null space virtual moment of each joint of the robotic arm based on the preset null space operator and the potential energy function comprise:

instructions for calculating a virtual torque of each joint of the robotic arm based on a preset damping parameter and the potential energy function, wherein the preset damping parameter is for suppressing vibrations during the motion of the robotic arm;
instructions for calculating the null space virtual torque of each joint of the robotic arm based on the preset null space operator and the virtual torque of the joint.

11. The controller of claim 10, wherein the instructions for calculating the virtual torque of each joint of the robotic arm based on the preset damping parameter and the potential energy function comprise:

instructions for calculating the virtual torque of each joint of the robotic arm using an equation of:

$$\tau_{\varnothing i} = -\frac{\partial \varnothing}{\partial \theta_i} - D\dot{\theta}_i i = 0, \ldots, n;$$

where, $\tau_{\varnothing i}$ is the virtual torque of the i-th joint of the robotic arm, $\varnothing$ is the potential energy function, $\dot{\theta}_i$ is the speed of the i-th joint, and D is the preset damping parameter.

12. The controller of claim 10, wherein the instructions for calculating the null space virtual torque of each joint of the robotic arm based on the preset null space operator and the virtual torque of the joint comprise:

instructions for calculating the null space virtual torque of each joint of the robotic arm using an equation of:

$$\tau_{\varnothing n} = N\tau_\varnothing;$$

$$N = I - J^T(J^{M+})^T; \text{ and}$$

$$J^{M+} = M^{-1}J^T(JM^{-1}J^T)^{-1};$$

where, $\tau_{\varnothing n}$ is the null space virtual moment of each joint of the robotic arm, N is the preset null space operator, I is an identity matrix, $J^{M+}$ is a Jacobian inverse matrix obtained by performing weighted calculation on a inertia matrix of the robotic arm, and $M^{-1}$ is the inertia matrix of the robotic arm.

13. A non-transitory computer readable storage medium for storing one or more computer programs, wherein the one or more computer programs comprise:
   instructions for obtaining a preset acceleration of an artificial gravitational field, a first vector of the artificial gravitational field in a preset reference coordinate system, a second vector of a feature point of the robotic arm in the preset reference coordinate system, and a third vector of a reference point in the preset reference coordinate system, wherein the direction of the first vector corresponds to a motion trend of the robotic arm, and a movement speed of the robotic arm is positively related to the magnitude of the preset acceleration;
   instructions for calculating a potential energy function of moving the feature point of the robotic arm to the reference point based on the preset acceleration, the first vector, the second vector, and the third vector;
   instructions for calculating a null space virtual moment of each joint of the robotic arm based on the preset null space operator and the potential energy function, wherein the preset null space operator is for keeping a pose of an end of the robotic arm unchanged during motion; and
   instructions for adjusting each joint based on the null space virtual moment of the joint.

14. The storage medium of claim 13, wherein the instructions for calculating the potential energy function of moving the feature point of the robotic arm to the reference point based on the preset acceleration, the first vector, the second vector, and the third vector comprise:
   instructions for calculating a fourth vector from the feature point to the reference point based on the second vector and the third vector; and
   instructions for calculating the potential energy function based on the first vector, the fourth vector, and the preset acceleration.

15. The storage medium of claim 14, wherein the instructions for calculating the potential energy function based on the first vector, the fourth vector, and the preset acceleration comprise:
   instructions for calculating the potential energy function using an equation of:

$\emptyset = k \langle \vec{\Delta p} \cdot \vec{n} \rangle$;

where, $\emptyset$ is the potential energy function, k is the preset acceleration, $\vec{\Delta p}$ is the fourth vector, $\vec{n}$, is the first vector, and $\langle \vec{\Delta p} \cdot \vec{n} \rangle$ represents a dot product of the fourth vector and the first vector.

16. The storage medium of claim 13, wherein the instructions for calculating the null space virtual moment of each joint of the robotic arm based on the preset null space operator and the potential energy function comprise:
   instructions for calculating a virtual torque of each joint of the robotic arm based on a preset damping parameter and the potential energy function, wherein the preset damping parameter is for suppressing vibrations during the motion of the robotic arm;
   instructions for calculating the null space virtual torque of each joint of the robotic arm based on the preset null space operator and the virtual torque of the joint.

17. The storage medium of claim 16, wherein the instructions for calculating the virtual torque of each joint of the robotic arm based on the preset damping parameter and the potential energy function comprise:
   instructions for calculating the virtual torque of each joint of the robotic arm using an equation of:

$$\tau_{\emptyset i} = -\frac{\partial \emptyset}{\partial \theta_i} - D\dot{\theta}_i i = 0, \ldots, n;$$

where, $\tau_{\emptyset i}$ is the virtual torque of the i-th joint of the robotic arm, $\emptyset$ is the potential energy function, $\dot{\theta}_i$ is the speed of the i-th joint, and D is the preset damping parameter.

18. The storage medium of claim 16, wherein the instructions for calculating the null space virtual torque of each joint of the robotic arm based on the preset null space operator and the virtual torque of the joint comprise:
   instructions for calculating the null space virtual torque of each joint of the robotic arm using an equation of:

$\tau_{\emptyset n} = N\tau_\emptyset$;

$N = I - J^T(J^{M+})^T$; and $J^{M+} = M^{-1}J^T(JM^{-1}J^T)^{-1}$;

where, $\tau_{\emptyset n}$ is the null space virtual moment of each joint of the robotic arm, N is the preset space operator, I is an identity matrix, $J^{M+}$ is a Jacobian inverse matrix obtained by performing weighted calculation on a inertia matrix of the robotic arm, and $M^{-1}$ is the inertia matrix of the robotic arm.

* * * * *